US011529872B2

(12) United States Patent
Schneebeck (10) Patent No.: US 11,529,872 B2
(45) Date of Patent: Dec. 20, 2022

(54) VEHICLE WITH DISPLAY DEVICE

(71) Applicant: Deutsche Post AG, Bonn (DE)

(72) Inventor: Holger Schneebeck, Cologne (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/811,507

(22) Filed: Mar. 6, 2020

(65) Prior Publication Data

US 2020/0282835 A1 Sep. 10, 2020

(30) Foreign Application Priority Data

Mar. 7, 2019 (DE) .................... 10 2019 105 855.4

(51) Int. Cl.
*B60K 35/00* (2006.01)
*G06F 3/14* (2006.01)
(Continued)

(52) U.S. Cl.
CPC .......... *B60K 35/00* (2013.01); *G02B 27/0101* (2013.01); *G02B 27/0149* (2013.01);
(Continued)

(58) Field of Classification Search
CPC ...... B60K 2370/152; B60K 2370/1529; B60K 2370/334; B60K 2370/1531;
(Continued)

(56) References Cited

U.S. PATENT DOCUMENTS 4,831,366 A * 5/1989 Iino ................. G02B 27/01
340/980
5,673,963 A * 10/1997 Pietzsch .............. E02F 9/26
296/70
(Continued)

FOREIGN PATENT DOCUMENTS

DE        10334720 A1    3/2005
DE    102013203162 A1    9/2013
(Continued)

OTHER PUBLICATIONS

German Office Action DE102019105855.4, dated Oct. 11, 2019, (12 pages).

Primary Examiner — Dismery Mercedes
(74) Attorney, Agent, or Firm — Dority & Manning, P.A.

(57) ABSTRACT

A vehicle (10) for a driver (14) of the vehicle (10) and a display device (16) are provided. The display device (16) includes a projection surface (18) extending in the horizontal and vertical direction and a projector (20) that is configured so as to project a projection (24) onto the projection surface (18). The projection surface (18) is curved in the horizontal direction and surrounds the driver (14) in the horizontal direction by at least one hundred degrees. A method for displaying a projection (24) on a projection surface (18) for a driver (14) of a vehicle (10) is also provided. The method includes: d) determining a viewing direction and/or head orientation (26) of the driver (14) towards the projection surface (18); and f) projecting the projection (24) onto the projection surface (18) in the viewing direction and/or head orientation (26) of the driver (14).

11 Claims, 3 Drawing Sheets

(51) Int. Cl.
*G02B 27/01* (2006.01)
*G06F 3/01* (2006.01)
(52) U.S. Cl.
CPC ......... *G02B 27/0179* (2013.01); *G06F 3/012* (2013.01); *G06F 3/14* (2013.01); *B60K 2370/1529* (2019.05); *B60K 2370/1533* (2019.05); *B60K 2370/31* (2019.05); *B60K 2370/334* (2019.05); *B60K 2370/48* (2019.05); *B60K 2370/52* (2019.05); *B60K 2370/66* (2019.05); *B60K 2370/73* (2019.05); *B60K 2370/80* (2019.05); *B60R 2300/20* (2013.01); *G02B 2027/013* (2013.01); *G02B 2027/0154* (2013.01); *G02B 2027/0181* (2013.01); *G02B 2027/0187* (2013.01)

(58) Field of Classification Search
CPC ............ B60K 2370/31; B60K 2370/52; B60K 2370/66; B60K 2370/73; B60K 2370/736; B60K 2370/149; B60K 2370/167; B60K 2370/785; B60K 2370/741; B60K 2370/67; B60K 2370/80; B60K 2370/1533; B60K 35/00; B60K 2370/29; G09G 2380/10; B60R 1/00; B60R 2300/205; B60R 2300/20; B60R 22/20; B60R 2300/101; B60R 2300/10; B60R 2300/70; B60R 2300/80; B60R 2300/802; B60R 2300/602; B60R 2001/1215; B60R 1/04; B60R 2300/00; B60R 11/02; G02B 27/0179; G02B 27/01; G02B 27/0101; G02B 27/0093; G02B 2027/0181; G02B 2027/013; G02B 27/0103; G02B 2027/0187; G02B 2027/0154; G02B 27/0172; G02B 27/18; G02B 2027/014; G02B 30/56; B60W 50/14; B60W 50/146; B60W 2050/146; B60W 2420/42; G06F 3/013; G06F 3/012; G06F 3/14
See application file for complete search history.

(56) References Cited

U.S. PATENT DOCUMENTS

| 5,931,254 | A | * | 8/1999 | Loraas | E02F 9/24 |
| | | | | | 180/272 |
| 7,810,933 | B2 | * | 10/2010 | Hashimoto | G03B 21/28 |
| | | | | | 353/98 |
| 8,947,219 | B2 | | 3/2015 | Popovic | |
| 9,084,004 | B2 | * | 7/2015 | Rawlinson | H04N 21/41422 |
| 2002/0141077 | A1 | * | 10/2002 | Nakamura | G02B 27/0149 |
| | | | | | 359/817 |
| 2004/0066376 | A1 | * | 4/2004 | Donath | G01C 21/365 |
| | | | | | 345/169 |
| 2006/0187421 | A1 | * | 8/2006 | Hattori | H04N 5/74 |
| | | | | | 353/69 |
| 2008/0002161 | A1 | * | 1/2008 | Streid | G03B 21/606 |
| | | | | | 359/451 |
| 2009/0231331 | A1 | * | 9/2009 | Holland | H04N 13/275 |
| | | | | | 345/419 |
| 2009/0251624 | A1 | * | 10/2009 | Ikunami | B60R 11/0235 |
| | | | | | 348/837 |
| 2010/0321170 | A1 | * | 12/2010 | Cooper | G02B 27/01 |
| | | | | | 345/9 |
| 2013/0235351 | A1 | | 9/2013 | Sachdev et al. | |
| 2014/0292755 | A1 | * | 10/2014 | Nagase | G06T 17/20 |
| | | | | | 345/423 |
| 2014/0327733 | A1 | * | 11/2014 | Wagreich | H04N 7/185 |
| | | | | | 348/37 |
| 2015/0130687 | A1 | * | 5/2015 | Kitamura | G01J 1/4204 |
| | | | | | 345/7 |
| 2015/0138449 | A1 | * | 5/2015 | Rawlinson | H04N 21/41422 |
| | | | | | 348/837 |
| 2015/0314682 | A1 | * | 11/2015 | Enriquez Ortiz | G02B 30/30 |
| | | | | | 701/49 |
| 2017/0052438 | A1 | | 2/2017 | Decock | |
| 2017/0217290 | A1 | * | 8/2017 | Yoshizumi | G09F 21/049 |
| 2017/0284069 | A1 | * | 10/2017 | Machida | G06V 20/52 |
| 2017/0349098 | A1 | * | 12/2017 | Uhm | G08G 1/0967 |
| 2018/0239141 | A1 | | 8/2018 | Cakmakci | |
| 2018/0356718 | A1 | * | 12/2018 | Nashida | G02B 30/00 |
| 2019/0037184 | A1 | * | 1/2019 | Gauba | H04N 9/3147 |
| 2019/0196184 | A1 | * | 6/2019 | Takizawa | G02B 27/0101 |
| 2019/0281264 | A1 | * | 9/2019 | Fujita | H04N 9/3155 |
| 2020/0027428 | A1 | * | 1/2020 | Weller | G02B 5/32 |
| 2022/0075191 | A1 | * | 3/2022 | Rittger | B60K 35/00 |

FOREIGN PATENT DOCUMENTS

| DE | 102017009596 A1 | 7/2018 |
| DE | 102017207788 | 11/2018 |
| DE | 102017218960 A1 | 4/2019 |
| EP | 2746833 A1 | 6/2014 |
| JP | 2002146846 | 5/2002 |
| KR | 20140084409 | 7/2014 |
| TW | 201520673 | 6/2015 |

* cited by examiner (Prior art)
Fig. 1

VEHICLE WITH DISPLAY DEVICE

CROSS-REFERENCE TO RELATED APPLICATION

The present application is related and has right of priority to German Patent Application No. 10 2019 105 855.4 filed on Mar. 7, 2019, which is incorporated by reference in its entirety for all purposes.

FIELD OF THE INVENTION

The subject matter relates generally to a vehicle for a driver of the vehicle and a display device. A method for displaying a projection on a projection surface for a driver of a vehicle is also proposed.

BACKGROUND

At present, information is conveyed to drivers of vehicles in the industrial sector, such as logistics or the construction industry, mostly via radio or fixedly mounted displays. This has the disadvantage that the information is not always situated in the field of view of the driver of the vehicle. The information is furthermore also not able to be embedded into a spatial context using fixedly mounted displays or radio.

One possibility for improving this situation is that of using head-up displays (HUDs) on which information is able to be displayed to the driver. Conventional HUDs are placed in the region of the windscreen or windshield, which corresponds to the primary viewing direction of the driver. However, forklift truck drivers and other drivers of vehicles in the industrial sector often have to change direction or travel relatively long distances in reverse due to the particular requirements of their activity. This requires frequent turning of the head in order to be able to take in the surroundings information required to correctly perform the driving manoeuvre and a task linked thereto. Accordingly, information on a conventional HUD is no longer situated in the field of view of the driver during reverse travel.

SUMMARY OF THE INVENTION

Based on this situation, one example object is to provide a vehicle with a display device and a corresponding method that does not exhibit these disadvantages.

Example aspects of the present invention provide a vehicle, in particular with a driver's cabin for a driver of the vehicle, and a display device. The display device includes a projection surface extending in the horizontal and vertical direction and a projector that is configured so as to project a projection onto the projection surface. The projection surface is curved in the horizontal direction and surrounds the driver, in particular in the driver's cabin, in the horizontal direction by at least one hundred degrees (100°). An alternative example solution includes a vehicle, in particular with a driver's cabin for a driver of the vehicle, and a display device. The display device includes a projection surface extending in the horizontal and vertical direction and a projector that is configured so as to project a projection onto the projection surface. The projection surface is curved in the horizontal direction.

One key aspect of the proposed solution is the fact that the projection surface is curved in the horizontal direction and surrounds the driver, in particular in the driver's cabin, in the horizontal direction by at least one hundred degrees (100°). The projection surface extends in the horizontal and vertical direction, wherein the curvature of the projection surface is preferably concave from the viewpoint of the driver. By virtue of the projection surface being curved, viewing the projection surface is more agreeable for the driver, since the curved shape is closer to the optical perception of the human eye than if the projection surface were not curved. This advantage of the curvature comes to the fore, in particular, in edge regions of the projection surface, since the distance between the driver and the edge regions of the projection surface is substantially identical to that between the driver and the central region of the projection surface. The curvature and the extent such that the projection surface surrounds the driver in the horizontal direction by at least one hundred degrees (100°) simplify the taking in of information for the driver. The projection surface preferably surrounds the driver by one hundred and twenty degrees (120°), one hundred and fifty degrees (150°), one hundred and eighty degrees (180°), two hundred and seventy degrees (270°), three hundred degrees (300°) or three hundred and sixty degrees (360°) degrees.

The vehicle may be any vehicle, preferably a vehicle that is used in the industrial and/or logistics sector, for example a lorry, a delivery van or a construction vehicle. The vehicle may be used for handling goods.

The vehicle preferably includes a driver's cabin for the driver of the vehicle. The display device is preferably attached to the driver's cabin. The display device may be connected to the driver's cabin in a detachable or fixed manner. The projection surface is thus preferably situated not directly on the driver's head, such as for example in the case of augmented reality glasses, such that the display device does not burden the head region of the driver. The driver is not restricted in terms of his freedom of movement by the display device, and does not have to wear such augmented reality glasses.

The display device includes the projector that is configured so as to project a projection onto the projection surface. The projector may project static images or else moving images, such as animations, onto the projection surface.

In one preferred example development, there is provision that the projection surface includes a transparent projection surface. The display device preferably includes a transparent projection surface, such as, for example, in the case of a head-up display (HUD). A transparent projection surface has the advantage that the driver is able to perceive the surroundings through the projection surface and is thus not restricted by the projection surface in terms of his perception of the surroundings. A transparent projection surface furthermore makes it particularly easy to embed the displayed projection into a spatial context. In the case of a transparent projection surface, the driver generally sees the mirrored imaging information as a virtual image and, at the same time, the real surroundings behind the projection surface. The generated virtual image may be projected such that the generated virtual image is able to be taken in by one eye or by both eyes.

The projection surface may in principle be constructed of or with of any transparent material. The projection surface preferably includes a projection surface made from Plexiglas or from another transparent plastic. This has the advantage that the curvature of the projection surface is able to be implemented very easily in comparison with a rigid material, such as for example glass. Such a design may furthermore save on manufacturing costs.

In one preferred example development, there is provision that an extent of the projection surface in the horizontal direction corresponds substantially to a horizontal extent of a direct field of view of the driver. A direct field of view with the meaning of the application is understood to mean the entirety of all of the fields of view when the driver moves his head and body but does not change his standing position and/or sitting position. The direct field of view in terms of its horizontal extent is for example approximately two hundred and seventy degrees (270°), depending on the sitting position and the mobility of the driver. Due to the fact that the extent of the projection surface in the horizontal direction is of substantially the same magnitude, that is to say in this example is also approximately two hundred and seventy degrees (270°), the projection surface is always within the field of view of the driver, including in the case of a head movement, such as a glance over the shoulder. The projection surface is thus matched to a turning movement of the driver's head in terms of its design with regard to extent and curvature. As a result, a driver does not have to turn his head in the direction of the windscreen or dashboard in order to take in information, since the information is in the field of view of the driver due to the projection onto the curved projection surface. Information may furthermore be displayed in a spatial context by virtue of this design of the projection surface. The driver may for example be informed about hazard points during reverse travel while looking backwards over his shoulder. The working processes of the driver are thus simplified, which increases working safety and contributes to an increase in productivity.

The vertical extent of the projection surface is preferably approximately ten centimetres (10 cm) to forty centimetres (40 cm), particularly preferably approximately fifteen centimetres (15 cm) to twenty centimetres (20 cm). More preferably, the horizontal extent of the projection surface is considerably greater than the vertical extent. The projection surface is preferably a relatively long and narrow substantially rectangular surface that is curved along its longer or horizontal extent and/or in the longitudinal direction.

In connection with projecting the projection onto the projection surface, in one preferred example development, the vehicle includes a sensor device. The sensor device is configured so as to determine a viewing direction and/or head orientation of the driver, and the projector is configured so as to project the projection in the viewing direction and/or head orientation of the driver. The projection is preferably projected onto a suitable point of the projection surface depending on the viewing direction and/or head orientation of the driver. The point on the projection surface is suitable when the point on the projection surface is situated in the current field of view of the driver. If the driver is for example travelling in reverse during a manoeuvre, due to the head orientation of the driver, the viewing direction is not in the direction of the windscreen, but rather backwards. A projection in the direction of the windscreen would accordingly also not be of any use to the driver. By contrast, a projection in the viewing direction of the driver, that is to say backwards in this example, may provide the driver with context-related information that the driver perceives immediately or virtually immediately.

The sensor device for determining the viewing direction and/or head orientation of the driver includes, for example, a camera that is directed towards the driver. The head orientation and/or viewing direction of the driver is able to be determined on the basis of the camera images. As an alternative or in addition, a motion sensor and/or acceleration sensor on the head of the driver may be used. This may for example determine the change in attitude of the head and thus the head orientation. More preferably, the sensor device is configured so as to additionally determine a vertical position of the head of the driver in the vehicle, and in particular in the driver's cabin.

Particularly preferably, the projector is configured so as to project context-related information onto the projection surface depending on the position and/or the orientation of the vehicle. For this purpose, the vehicle is equipped for example with a position determination system such that the position of the vehicle is able to be determined. The vehicle may furthermore be equipped with an attitude sensor in order to determine the orientation of the vehicle. Information that relates to the current surroundings of the vehicle may thus be projected onto the projection surface in combination with the head direction and/or viewing direction of the driver.

The projector is preferably furthermore configured so as to project the context-related information such that essentially no or only little accommodation is necessary from the driver in order to clearly perceive the information. By way of example, during a reverse driving manoeuvre, the driver concentrates on the route to be covered, meaning that the driver for example focuses on a point at a distance of, for instance, five metres (5 m) away on the route. If directional arrows are then projected onto the projection surface as information, the virtual image of these directional arrows preferably likewise appears at a distance of five metres (5 m) away on the route. The accommodation effort, that is to say the adjustment of the refractive power of the eye, in order to image the virtual image sharply on the retina of the eye, is accordingly low. The same lighting conditions also exist when focusing on the virtual image, such that the adaptation effort is low. The driver is thus able to take in the displayed projection quickly without the eyes displaying symptoms of fatigue. There is furthermore preferably provision that the projector is configured so as to adjust the brightness of the projection depending on the ambient brightness. This likewise makes it considerably easier for the driver to take in information.

For the purpose of incorporating the projection surface into the vehicle, in one preferred embodiment, there is provision that the projection surface, in the horizontal direction, surrounds the driver in the vehicle, and in particular in the driver's cabin, essentially in the shape of a horseshoe, ring segment, circular segment, ring or circle. The projection surface may surround the driver in the shape of a circle, wherein the driver is in this case surrounded by the projection surface. As an alternative, it is possible that the projection surface surrounds the driver in the shape of a ring. In both cases, the driver is preferably surrounded by the projection surface by three hundred and sixty degrees (360°). This has the advantage that the projection surface is always in the field of view of the driver, regardless of the horizontal direction in which the driver is looking. As an alternative, it is possible that the projection surface does not completely surround the driver, but rather the projection surface surrounds the driver essentially in the shape of a horseshoe, ring segment or circular segment. In this case, a portion of the three hundred and sixty degrees (360°) is not surrounded by a projection surface. The projection surface preferably surrounds the driver, in particular in the driver's cabin, essentially in a horseshoe shape or U-shape in the horizontal direction. This has the advantage that the projection surface is able to be integrated particularly easily into the driver's cabin or the vehicle. In this case, the opening in the horseshoe shape or U-shape preferably does not point in the direction of the windscreen, but rather towards the rear.

In one preferred development, the projector is arranged with respect to the projection surface such that a distance from the projector to the projection surface is substantially identical at all points of the projection surface due to the curvature of the projection surface. In the case of a projection surface curved essentially in the shape of a horseshoe, ring segment, circular segment, ring or circle, the projector is situated substantially in the centre of the circle, ring, horseshoe, ring segment or circular segment. As an alternative, the projector may be situated within a vertical axis that leads through the centre of the circle, ring, horseshoe, ring segment or circular segment, and thus be arranged above or below the plane of the circle, ring, horseshoe, ring segment or circular segment that is formed by the curvature of the projection surface. The arrangement considerably simplifies the projection onto the projection surface, since the distance between the projector and the projection surface remains substantially identical regardless of the portion of the projection surface onto which the projection takes place.

The display device may in principle be installed at different locations of the vehicle or of the driver's cabin. In one preferred development, however, there is provision that the projection surface and/or the projector are/is installed on a roof and/or on a chassis of the vehicle and/or of the driver's cabin. The projection surface and the projector are preferably installed on the roof and/or on the chassis of the vehicle and/or of the driver's cabin. The projection surface is thus situated in particular at a similar height to the head of the driver of the vehicle. As a result, the projection surface is in the field of view of the driver, in particular within the vertical field of view of the driver. The driver is able to see the projection surface without having to look very far up or down.

For the purpose of easy handling, in one preferred example development, there is provision that the projection surface and/or the projector are/is able to be shifted and/or moved vertically. The projection surface and/or the projector are/is preferably able to be adjusted in terms of height. In order to allow sufficient visibility of the projection surface for the driver, the projection surface is preferably situated roughly at or slightly above the eye level of the driver. Due to the fact that the projection surface is able to be shifted and/or moved vertically, it is able to be adjusted to drivers of different sizes and may be sufficiently visible to the driver regardless of the body size of the driver. The projection surface may furthermore be shifted upwards in terms of height when the driver gets in and gets out, such that a risk of injury is reduced. The projector is preferably also able to be shifted and/or moved vertically in order to adjust the height of the projector to the height of the projection surface. The projection surface and/or the projector are/is preferably shifted vertically by way of a control unit. This may be performed fully automatically, or the driver may for example operate the control unit manually.

While using the vehicle, the vehicle may be subject to impacts or vibrations, for example due to uneven ground or as a result of transporting goods. These impacts or vibrations may in principle be transferred to the display device installed on the vehicle, which may lead to the projection being displayed in blurred form. In this connection, in a further preferred development, the projection surface and/or the projector are/is installed on the vehicle such that vibrations and/or impacts are damped and/or absorbed. The display device is preferably installed on the vehicle using shock absorbers or other suspension systems such that vibrations and/or impacts are absorbed or damped. Without these measures, vibrations would subside too slowly and the projection would be displayed in blurred form. Hydraulic damping or friction damping may for example be used. Hydraulic telescopic shock absorbers are preferably used for the suspension system for the projection surface and/or the projector on the vehicle, and in particular on the driver's cabin. The suspension system for the projection surface and/or for the projector on the vehicle particularly preferably includes a cardanic suspension system. As an alternative, rotary shock absorbers, electromechanical damping system or air suspension dampers in which the medium air takes on both suspension and damping tasks may be used.

In connection with the projection in the viewing direction and/or head orientation of the driver, in one preferred development, the projector is able to be rotated about a vertical axis. The axis of rotation of the projector in this case particularly preferably corresponds to the axis of suspension of the projector. It is thus easily possible to perform projection onto different regions of the projection surface by rotating the projector about its axis of suspension. The rotational movement of the projector may for example be driven by an electric motor.

In this connection, in one preferred example development, the display device includes a control unit that controls the projector and/or the projection surface. The control unit preferably controls the rotational movement of the projector depending on the viewing direction/head orientation of the driver. More preferably, the control unit controls the vertical shifting and/or movement of the projection surface and/or of the projector. The control unit, in particular, controls the vertical shifting and/or movement of the projection surface and/or of the projector depending on the vertical position of the head of the driver in the vehicle, and in particular the driver's cabin. For this purpose, the control unit is preferably connected in terms of communication to the sensor device. More preferably, the control unit determines the projection to be projected such that it is displayed in undistorted form on the curved projection surface. Since the curvature of the projection surface, for example, in the case of a horseshoe-shaped curved projection surface, is not identical at each point of the projection surface, the control unit preferably removes distortion from the projection depending on the direction of projection. The control unit is preferably connected in terms of communication to a server and/or a network. The information to be projected, for example, is conveyed via said server and/or network to the control unit in the form of data. It is furthermore possible that the control unit is connected in terms of communication to a position determination system and/or an attitude sensor that determine the position or attitude of the industrial truck. Specific information tailored to the position and the orientation of the industrial truck may thus be provided to the driver in the spatial context.

In one preferred example development of the invention, there is provision that the vehicle is an industrial truck, a wheel loader, an excavator, an agricultural machine and/or a lorry. The vehicle may likewise be designed as an aircraft cockpit, as a ship, as a tractor, as a combine harvester and/or as a remote-control workstation for remote operations. In particular, in the latter fields of application, the proposed solution allows for example considerably improved control or else improved navigation. The vehicle is preferably not a passenger vehicle, but rather a vehicle that is used in the industrial/logistics sector. These kinds of vehicle are often driven in reverse or perform complex driving manoeuvres with frequent changes of direction. These vehicles are furthermore used to perform tasks whose implementation benefits greatly from a context-related display of information. An industrial truck may be a means of transport used to horizontally transport goods, such as, for example, a pallet truck, hauler, wheel loader, tractor or forklift truck.

Example aspects of the present invention are furthermore achieved by a method for displaying a projection on a projection surface for a driver of a vehicle, in particular with a driver's cabin, wherein the projection surface extends in the horizontal and vertical direction, is curved in the horizontal direction and surrounds the driver, in particular in the driver's cabin and/or in the vehicle, in the horizontal direction by at least one hundred degrees (100°), that includes the following:

d) determining a viewing direction and/or head orientation of the driver towards the projection surface; and f) projecting the projection onto the projection surface in the viewing direction and/or head orientation of the driver.

One alternative example solution is a method for displaying a projection on a projection surface for a driver of a vehicle with a driver's cabin, wherein the projection surface extends in the horizontal and vertical direction, is curved in the horizontal direction, having the steps of: determining a viewing direction and/or head orientation of the driver towards the projection surface; and projecting the projection onto the projection surface in the viewing direction and/or head orientation of the driver.

The proposed method is distinguished in that the projection is projected onto the curved projection surface in the viewing direction and/or head orientation of the driver. The viewing direction and/or head orientation of the driver are/is preferably determined in d) by way of a sensor device, for example a camera. More preferably, a projector is used to project the projection in f) in the method. This leads to a situation whereby the projection is able to be displayed for the driver in a context with respect to the surroundings of the vehicle, such that the working processes are simplified for the driver. The driver, in particular, does not have to change his viewing direction in order to take in information, since said information is projected in the viewing direction and/or head orientation of the driver. The method is particularly well-suited to transparent projection surfaces, since in this case the projected information is able to be embedded well into the spatial context. It is thus preferably a method for displaying a projection on a transparent projection surface.

According to one preferred example development, the method additionally includes the following:

b) determining a vertical position of the head of the driver in the vehicle, and in particular in the driver's cabin; and c) vertically shifting and/or moving the projection surface and/or the projector depending on the vertical position of the head of the driver.

In this case, there is preferably provision in b) that the sensor device records the vertical position of the head of the driver in the vehicle, and in particular in the driver's cabin. The vertical position of the projection surface and/or projector is then adjusted to the position of the head and thus to the body size of the driver in c). The projection surface and/or the projector are/is preferably shifted vertically by way of the control unit. This may be performed fully automatically or the driver may, for example, operate the control unit manually, and thus adjust the vertical position of the projection surface and/or of the projector. These steps allow the projection surface to be set in terms of height such that it is in the field of view of the driver regardless of the body size of the driver.

In one preferred development, the method additionally includes the following:

e) rotating the projector in the viewing direction and/or head orientation of the driver; and g) vertically shifting and/or moving the projection surface and/or the projector into a starting position.

The projector is rotated into the viewing direction and/or head orientation of the driver before the projection is projected onto the projection surface in the viewing direction and/or head orientation of the driver in f). There is furthermore provision that, after the projection has been projected onto the projection surface, the projection surface and/or the projector are/is shifted vertically into the starting position. A position that allows the driver to get in and get out of the industrial truck easily, without the driver encountering the risk of injuring his head on the projection surface or the projector, is preferably provided as a starting position. By way of example, the starting position may be a position directly underneath the roof of the vehicle, and in particular of the driver's cabin. e) and g) are preferably performed by way of the control unit.

In one preferred example development, the method additionally includes the following step:

a) determining a presence of the driver in the vehicle, and in particular in the driver's cabin, wherein the method runs automatically after the vehicle is started by the driver.

It is a method that runs automatically. The method is started when the vehicle is started, for example by turning the ignition key or if another safety mechanism of the vehicle is triggered. It may thereby in principle be determined directly whether a driver is present in the vehicle, and in particular in the driver's cabin. As an alternative, presence may be determined in the same way as b) using the sensor device. As a further alternative, other sensors, for example a seat sensor in the vehicle, may be used.

BRIEF DESCRIPTION OF THE DRAWINGS

The proposed solution is explained in more detail below with reference to the appended drawings on the basis of preferred exemplary embodiments.

In the drawings.

DETAILED DESCRIPTION

The exemplary embodiments described are simply examples which can be modified and/or supplemented in diverse ways within the framework of the claims. Each feature which has been described for a certain exemplary embodiment can be utilized independently or in combination with other features in an arbitrary other exemplary embodiment. Each feature which has been described for an exemplary embodiment of a certain category can also be used in a corresponding manner in an exemplary embodiment of another category.

Figure 1:
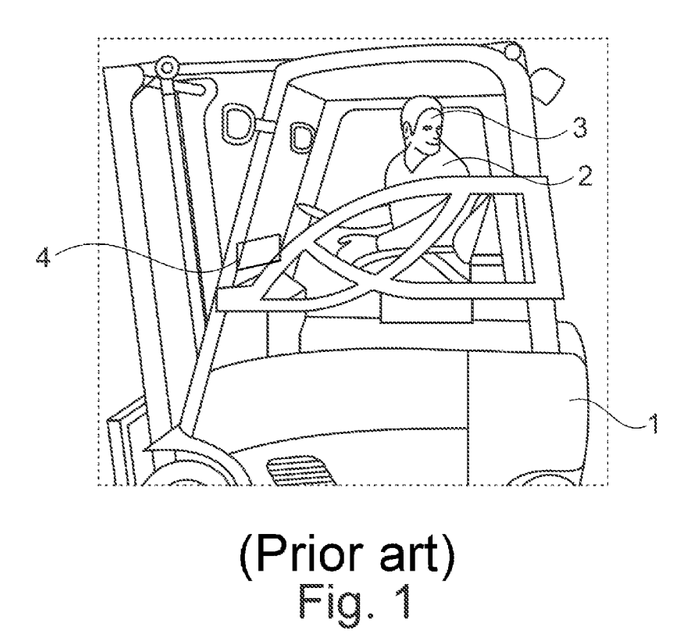
FIG. 1 shows a schematic view of an industrial truck from the prior art.

FIG. 1 shows an industrial truck 1 from the prior art. The driver 2 of the industrial truck often has to change direction or cover relatively long distances in reverse due to the particular requirements of his activities. For this purpose, the driver 2 turns his head 3 in order to be able to take in the surroundings information required to correctly perform the driving manoeuvre and a task linked thereto. Information provided to the driver 2 on a display 4 on the dashboard is in this case no longer situated in the field of view of the driver 2.

Figure 2:
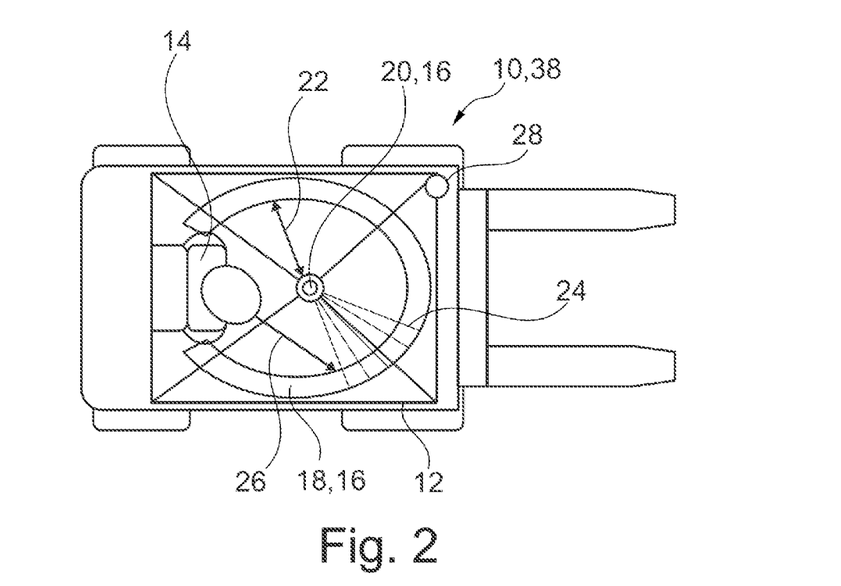
FIG. 2 shows a schematic plan view of a vehicle with a driver's cabin for a driver of the vehicle and a display device according to one preferred exemplary embodiment.

FIG. 2 shows a schematic plan view of a vehicle 10 with a driver's cabin 12 for a driver 14 of the vehicle 10 and a display device 16 according to one preferred exemplary embodiment. In the exemplary embodiment preferred here, the vehicle 10 is an industrial truck 38. The display device 16 includes a projection surface 18 and a projector 20. The projection surface 18 is curved in the horizontal direction, this being able to be seen particularly well through the plan view. The projection surface 18 thus surrounds the driver 14 of the industrial truck 38 in the driver's cabin 12 essentially in the shape of a horseshoe, wherein the sitting position of the driver 14 is situated substantially at the location of the opening in the horseshoe. The projector 20 is substantially in the centre of the horseshoe-shaped projection surface 18, such that the distance 22 from the projector 20 to the projection surface 18 is substantially identical at all points of the projection surface 20.

The projector 20 is configured so as to project a projection 24 onto the projection surface 18. The projection 18 is projected in the viewing direction/head orientation 26 of the driver 14. For this purpose, a sensor device 28, here a camera, is used to determine the viewing direction/head orientation 26 of the driver 14. In this exemplary embodiment, the camera is situated in the corner of the driver's cabin 12.

Figure 3:
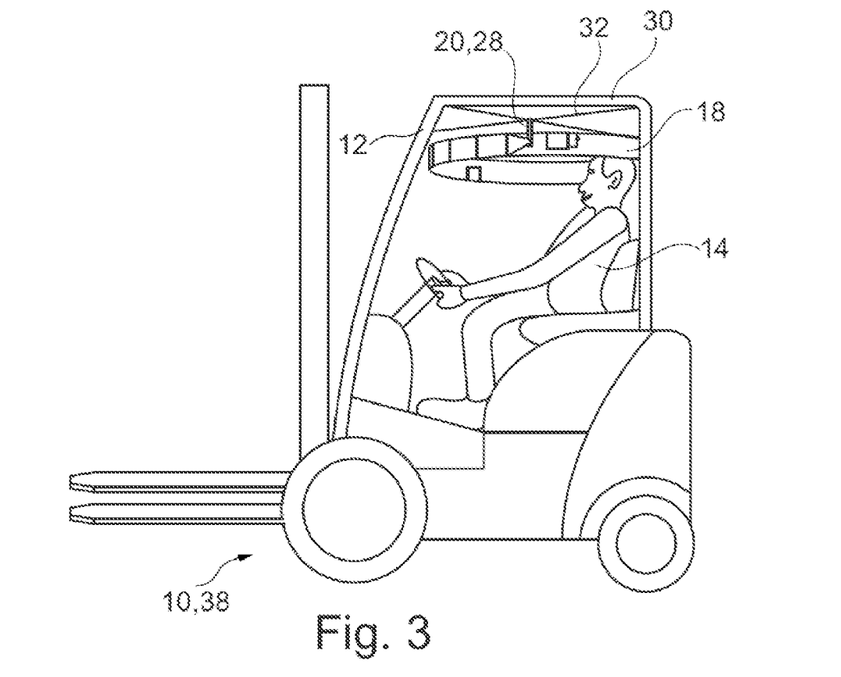
FIG. 3 shows a further schematic view of the vehicle from FIG. 2 according to one preferred exemplary embodiment.

FIG. 3 shows a further schematic view of the industrial truck 38, it being able to be seen in particular that the projection surface 18 is installed on the roof 30 of the driver's cabin 12 of the industrial truck 38. The projection surface 18 is situated roughly at or slightly above the eye level of the driver 14. The projection surface 18 is constructed of or with transparent Plexiglas, such that the view of the driver 14 is not hindered. The vertical extent of the projection surface 18 is approximately fifteen to twenty centimetres (15-20 cm). The suspension system 32 for the projection surface 18 and for the projector 20 on the roof 30 of the driver's cabin 12 has a mechanism consisting of springs and telescopic dampers and is able to be adjusted continuously in terms of height. The necessary power and data cables run through the suspension system 32, wherein the power is drawn by the vehicle system. In this exemplary embodiment, the camera of the sensor device 28 is situated directly at the projector 22.

Figure 4:
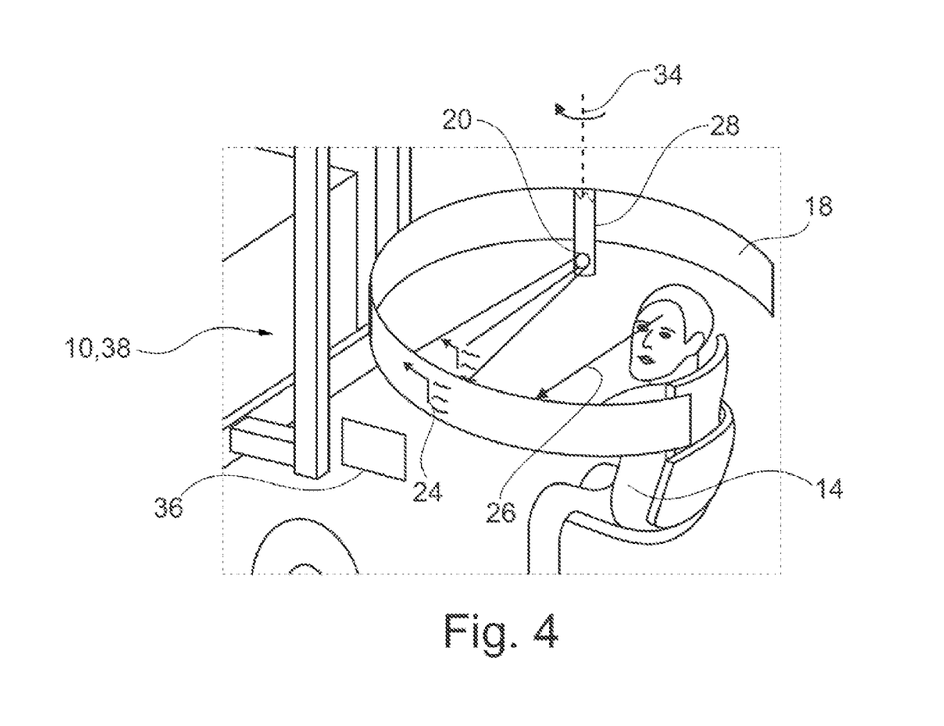
FIG. 4 shows a detailed view of the driver's cabin of the vehicle from FIG. 2 according to one preferred exemplary embodiment.

FIG. 4 shows a detailed view of the driver's cabin 12 of the industrial truck 38 according to one preferred exemplary embodiment. The projector 20 may be rotated by way of an E-motor, and thus illuminate all of the regions of the projection surface 18. The axis of rotation 34 of the projector 18 in this case corresponds to the axis of suspension of the projector 18. In this exemplary embodiment, the sensor device 28, which is formed by a camera, sits directly on the lower end of the projector 18 and is oriented fixedly towards the head of the driver 14. The sensor device 28 records changes in the head position of the driver 14. A control unit 36 accommodated in the vehicle controls the height of the projector 20 and of the projection surface 18. The control unit 36 furthermore controls the rotational movement of the projector 20 depending on the viewing direction/head orientation 26 of the driver 14. For this purpose, the control unit 36 is connected in terms of communication to the sensor device 28.

The control unit 36 is furthermore connected in terms of communication to a server and/or a network, for example an IoT (Internet of Things) platform. The information to be projected is conveyed via said server and/or network to the control unit 36 in the form of data. In this exemplary embodiment, the control unit 36 is provided with context-related information depending on the position and/or the orientation of the industrial truck 38, which information is then projected onto the projection surface 18. A directional arrow is shown as projection 24 here in FIG. 4.

Figure 5:
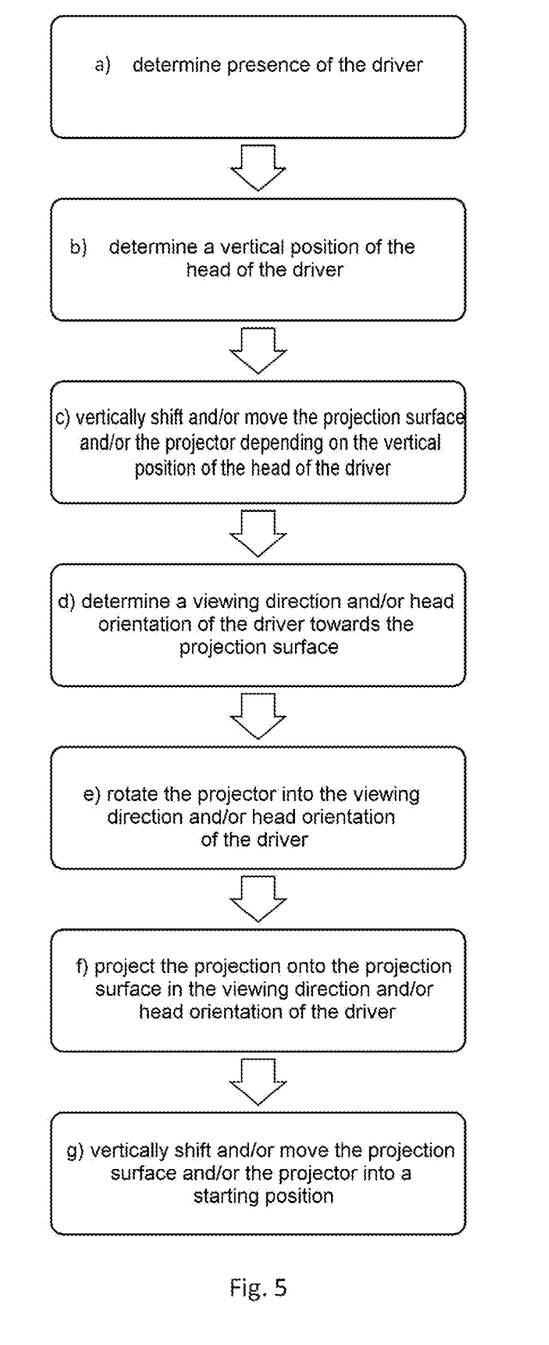
FIG. 5 shows a flowchart with the method for displaying a projection on a transparent projection surface for a driver of a vehicle according to one preferred exemplary embodiment.

FIG. 5 shows a flowchart with the method for displaying a projection 24 on a transparent projection surface 18 for a driver 14 of a vehicle 10 according to one preferred exemplary embodiment. In this exemplary embodiment, the method is performed using the industrial truck 38 from FIG. 2. The method comprises a) to g) shown in FIG. 5.

It is determined in a) whether the driver 14 is present in the driver's cabin 12 of the industrial truck 38. This is performed by the sensor device 28, here a camera. In the affirmative case, the vertical position of the head of the driver 14 in the driver's cabin 12 is recorded by way of the sensor device 28 in b).

The vertical position of the projection surface 18 and/or projector 20 is then adjusted to the position of the head of the driver 14 and thus to the body size of the driver 14 by way of the control unit 36 in c). The projection surface 18 thus for example moves downwards from its suspension system 32 directly underneath the roof 30 of the industrial truck 38 until the projection surface 18 lies roughly above eye level of the driver 14.

In d), the viewing direction and/or head orientation 26 of the driver 14 towards the projection surface 18 is likewise determined by way of the sensor device 28.

On the basis of the viewing direction and/or head orientation 26, the projector 20 is rotated into the viewing direction and/or head orientation 26 of the driver 14 by way of the control unit 36 in e), such that the projector 20 projects a projection 24 onto the projection surface 18 in the viewing direction and/or head orientation 26 of the driver 14 in f). The projection 24 thus lies directly in the field of view of the driver, such that it is very easy for the driver 14 to take in information.

In order to make it easier for the driver 14 to get out of the industrial truck 38, the projection surface 18 and/or the projector 20 are/is shifted vertically into the starting position in g), wherein the starting position is directly underneath the roof 30 of the driver's cabin 12 in this exemplary embodiment. In the same way as c), g) is also performed by way of the control unit 36.

The described exemplary embodiments are merely examples that may be modified and/or added to in many ways within the scope of the claims. Any feature that has been described for a particular exemplary embodiment may be used on its own or in combination with other features in any other exemplary embodiment. Any feature that has been described for an exemplary embodiment in one particular category may also be used accordingly in an exemplary embodiment in another category. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE SIGNS

Industrial truck (prior art) 1
Driver (prior art) 2
Head (prior art) 3
Display (prior art) 4
Vehicle 10
Driver's cabin 12
Driver 14
Display device 16
Projection surface 18
Projector 20
Distance 22
Projection 24
Viewing direction/head orientation 26
Sensor device 28
Roof 30
Suspension system 32
Axis of rotation 34
Control unit 36
Industrial truck 38

The invention claimed is:

1. A vehicle (10), comprising:
a sensor device (28) configured to detect a presence of a driver within a driver cabin, to detect a vertical position of a head of a driver, and to detect one or both of a viewing direction and a head orientation (26) of the driver (14) towards the projection surface (18); and
a display device (16) including a transparent projection surface (18) and a rotatable projector (20), the projector (20) configured to project a projection (24) onto the projection surface (18) by emitting light onto the projection surface (18), the projection surface (18) positioned within the driver cabin of the vehicle, installed underneath a roof (30) of the driver cabin by a suspension system (32) comprising hydraulic telescopic shock absorbers, extends in a horizontal direction and a vertical direction, is curved in the horizontal direction, and is configured to surround the driver (14) of the vehicle (10) in the horizontal direction by at least one hundred degrees,
wherein the projection surface (18) is movable along a vertical axis, based on the detected vertical position of the head of the driver from the sensor device (28), without changing a width that the projection surface (18) extends along the vertical direction, and
wherein a control unit controls a rotation of the projector (20) in order to project the projection (24) onto the projection surface (18) based on one or both of the detected viewing direction and the detected head orientation (26) of the driver from the sensor device (28).

2. The vehicle (10) of claim 1, wherein the projection surface (10) extends in the horizontal direction such that an extent of the projection surface (10) in the horizontal direction corresponds substantially to a horizontal extent of a direct field of view of the driver (14).

3. The vehicle (10) of claim 1, wherein the projection surface (18) is configured to surround the driver (14) in the horizontal direction essentially in the shape of a horseshoe, a ring segment, a circular segment, a ring, or a circle.

4. The vehicle (10) of claim 1, wherein the projector (20) is positioned relative to the projection surface (18) such that a distance (22) from the projector (20) to the projection surface (18) is substantially identical at all points of the projection surface (18) due to the curvature of the projection surface (18).

5. The vehicle (10) of claim 1, wherein one or both of the projection surface (18) and the projector (20) is installed on a roof (30) of the vehicle (10), on a chassis of the vehicle (10), or on both the roof (30) and the chassis of the vehicle (10).

6. The vehicle (10) of claim 1, wherein the projection surface (18) is installed on the vehicle (10) with the suspension system (32) such that vibrations and/or impacts are damped and/or absorbed.

7. The vehicle (10) of claim 1, wherein the display device (16) comprises a control unit (36) that controls one or both of the projector (20) and the projection surface (18).

8. The vehicle (10) of claim 1, wherein the vehicle (10) is an industrial truck (38), a wheel loader, an excavator, an agricultural machine, or a lorry.

9. A method for displaying a projection (24) on a transparent projection surface (18) of a display device (16) for a driver (14) of a vehicle (10), the display device (16) comprising the transparent projection surface (18) and a rotatable projector (20), the projector (20) configured to project a projection (24) onto the projection surface (18) by emitting light onto the projection surface (18), the projection surface (18) positioned within a driver cabin of the vehicle, installed underneath a roof (30) of the driver cabin by a suspension s stem (32) comprising hydraulic telescopic shock absorbers, extends in a horizontal direction and a vertical direction, is curved in the horizontal direction, and is configured to surround the driver (14) of the vehicle (10) in the horizontal direction by at least one hundred degrees, the method comprising:
determining, with a sensor device (28), that the driver (14) is located within the driver cabin;
determining, with the sensor device (28), a vertical position of the head of the driver (14) in the vehicle (10);
moving the projection surface (18) along a vertical axis, based on the determined vertical position of the head of the driver from the sensor device (28), without changing a width that the projection surface (18) extends along the vertical direction;
determining, with the sensor device (28), one or both of a viewing direction and a head orientation (26) of the driver (14) towards the projection surface (18); and
projecting the projection (24) onto the projection surface (18) in one or both of the determined viewing direction and the determined head orientation (26) of the driver (14) by rotating the projector (20).

10. The method of claim 9, further comprising vertically moving one or both of the projection surface (18) and the projector (20) into a starting position.

11. The method of claim 9, further comprising:
determining a presence of the driver (14) in the vehicle (10); and
automatically initiating the method after the vehicle (10) is started by the driver (14).

* * * * *